United States Patent

Yoshikawa et al.

(10) Patent No.: US 8,969,812 B2
(45) Date of Patent: Mar. 3, 2015

(54) GARNET-TYPE CRYSTAL FOR SCINTILLATOR AND RADIATION DETECTOR USING THE SAME

(75) Inventors: Akira Yoshikawa, Miyagi (JP); Takayuki Yanagida, Miyagi (JP); Kei Kamada, Ibaraki (JP); Hiroki Sato, Ibaraki (JP); Kosuke Tsutsumi, Ibaraki (JP); Takanori Endo, Ibaraki (JP); Shigeki Ito, Ibaraki (JP)

(73) Assignees: Furukawa Co., Ltd., Tokyo (JP); Tohoku Techno Arch Co., Ltd., Miyagi (JP)

( * ) Notice: Subject to any disclaimer, the term of this patent is extended or adjusted under 35 U.S.C. 154(b) by 0 days.

(21) Appl. No.: 13/982,653

(22) PCT Filed: Jan. 27, 2012

(86) PCT No.: PCT/JP2012/000525
§ 371 (c)(1),
(2), (4) Date: Jul. 30, 2013

(87) PCT Pub. No.: WO2012/105202
PCT Pub. Date: Aug. 9, 2012

(65) Prior Publication Data
US 2013/0306874 A1    Nov. 21, 2013

(30) Foreign Application Priority Data

Jan. 31, 2011   (JP) ................. 2011-018579
Jan. 31, 2011   (JP) ................. 2011-018583
Jan. 31, 2011   (JP) ................. 2011-018586

(51) Int. Cl.
*G01T 1/10*    (2006.01)
*C09K 11/77*   (2006.01)
(Continued)

(52) U.S. Cl.
CPC ......... *C09K 11/7769* (2013.01); *C09K 11/7774* (2013.01); *G01T 1/202* (2013.01); *G01T 1/2023* (2013.01); *G21K 4/00* (2013.01)

USPC ....................................... 250/361 R

(58) Field of Classification Search
CPC ......................................... G01T 1/202
USPC ....................................... 250/361 R
See application file for complete search history.

(56) References Cited

U.S. PATENT DOCUMENTS 6,458,295 B1 * 10/2002 Yamada et al. ......... 252/301.4 R
6,479,420 B2 * 11/2002 Nakamura .................... 501/152
(Continued)

FOREIGN PATENT DOCUMENTS

CN    1629251        6/2005
JP    2001-004753    1/2001
(Continued)

OTHER PUBLICATIONS

International Search Report dated May 1, 2012 filed in PCT/JP2012/000525.
(Continued)

*Primary Examiner* — Kiho Kim
(74) *Attorney, Agent, or Firm* — Rankin, Hill & Clark LLP

(57) ABSTRACT

The garnet-type crystal for a scintillator of the present invention is represented by General Formula (1), (2), or (3), $$Gd_{3-x-y}Ce_xRE_yAl_{5-z}Ga_zO_{12} \quad (1)$$

wherein in Formula (1), $0.0001 \leq x \leq 0.15$, $0 \leq y \leq 0.1$, $2 < z \leq 4.5$, and RE represents at least one selected from Y, Yb, and Lu;

$$Gd_{3-a-b}Ce_aLu_bAl_{5-c}Ga_cO_{12} \quad (2)$$

wherein in Formula (2), $0.0001 \leq a \leq 0.15$, $0.1 < b \leq 3$, and $2 < c \leq 4.5$;

$$Gd_{3-p-q}Ce_pRE'_qAl_{5-r}Ga_rO_{12} \quad (3)$$

wherein in Formula (3), $0.0001 \leq p \leq 0.15$, $0.1 < q \leq 3$, $1 < r \leq 4.5$, and RE' represents Y or Yb.

20 Claims, 8 Drawing Sheets

(51) Int. Cl.
*G01T 1/202* (2006.01)
*G21K 4/00* (2006.01)

(56) References Cited

U.S. PATENT DOCUMENTS

| | | | |
|---|---|---|---|
| 6,630,077 B2 * | 10/2003 | Shiang et al. | 252/301.4 R |
| 6,706,213 B2 * | 3/2004 | Yamada et al. | 252/301.4 R |
| 8,013,506 B2 * | 9/2011 | Bukesov et al. | 313/483 |
| 2003/0075706 A1 | 4/2003 | Shiang et al. | |
| 2003/0127630 A1 | 7/2003 | Vartuli et al. | |
| 2004/0066883 A1 | 4/2004 | Kanai et al. | |
| 2004/0084655 A1 | 5/2004 | Vartuli et al. | |
| 2008/0017802 A1 | 1/2008 | Nakamura et al. | |
| 2008/0213151 A1 | 9/2008 | Yoshikawa et al. | |
| 2009/0129055 A1 | 5/2009 | Morizawa et al. | |
| 2009/0261255 A1 | 10/2009 | Nakamura et al. | |
| 2010/0187423 A1 | 7/2010 | Nakamura et al. | |

FOREIGN PATENT DOCUMENTS

| | | |
|---|---|---|
| JP | 2002-189080 | 7/2002 |
| JP | 2005-095514 | 4/2005 |
| JP | 2007-217456 | 8/2007 |
| JP | 2009-046610 | 3/2009 |
| WO | 99/33934 | 7/1999 |
| WO | 2006/049284 | 5/2006 |
| WO | 2006/068130 | 6/2006 |

OTHER PUBLICATIONS

Chinese Office Action dated Jun. 4, 2014 filed in corresponding Chinese application 201280007244.1.

Extended European Search Report dated Oct. 6, 2014 issued in the corresponding European patent application No. 12742388.7.

* cited by examiner

GARNET-TYPE CRYSTAL FOR SCINTILLATOR AND RADIATION DETECTOR USING THE SAME

TECHNICAL FIELD

The present invention relates to a garnet-type crystal for a scintillator and a radiation detector using the same.

BACKGROUND ART

A scintillator single crystal is used for a radiation detector that detects a γ-ray, X-ray, α-ray, β-ray, neutron ray, and the like. Such a radiation detector is being widely applied to medical imaging devices such as a Positron Emission Tomography (PET) device and an X-ray Computerized Tomography (CT) device, various radiation measurement devices in the field of high energy physics, resource exploration devices, and the like. The radiation detector is generally constituted with a scintillator that absorbs the γ-ray, X-ray, α-ray, β-ray, neutron ray, and the like and converts these into plural low-energy photons (scintillation light) and a light-receiving element that receives the luminescence from the scintillator and converts the light into electric signals. In the diagnosis of cancer that uses the Positron Emission Tomography (PET) device, glucose having a property of gathering around cancer cells is mixed with a trace of radioisotope and administered to a patient in advance, the γ-ray emitted from the substance is converted into plural low-energy photons by a scintillator, the photons are converted into electric signals by using a Photodiode (PD), a Silicon Photomultiplier (Si-PM), a Photomultiplier Tube (PMT), or other photodetectors, and the electric signals undergo data processing by using a PC or the like to obtain information such as images, whereby the site of cancer is found. Each of a pair of γ-rays is emitted in a diametrically opposite direction. In the PET device, radiation detectors (constituted with a scintillator and a photodetector) are arranged in a cylindrical shape, the scintillators at two locations that the γ-rays hit emit light, and the photodetectors convert the light into electric signals. All of the electric signals are collected by a circuit in the rear of the device and reconstructed into an image by using software. Even in the radiation detector in high energy physics, the process, in which the scintillator converts radiation into plural low-energy photons, the photons are converted into electric signals by using a Photodiode (PD), a Silicon Photomultiplier (Si-PM), a Photomultiplier Tube (PMT), or other light-receiving elements, and the electric signals undergo data processing by using a PC or the like, is applied in the same manner.

A PD or Si-PM is used for extensive purposes particularly in radiation detectors or imaging instruments. Various PDs are known, and the PD or Si-PM constituted with a silicon semiconductor exhibits high sensitivity to a wavelength of 450 nm to 700 nm, and the sensitivity thereof becomes the highest at around 600 nm. Accordingly, they are used in combination with a scintillator having a peak emission wavelength around 600 nm. For radiation imaging, a combination of a scintillator array and a photodetector array is used. Examples of the photodetector include a position-sensitive PMT and an array of semiconductor photodetectors, that is, a PD array, an Avalanche Photodiode array (APD array), a Geiger-mode APD array, and the like. The photodetector identifies which pixels luminesce in the scintillator array, thereby making it possible to ascertain at which position the radiation enters in the scintillator array.

Therefore, the scintillator appropriate for these radiation detectors are required to have high density and a high atomic number (have a high photoelectric absorption ratio) in view of detection efficiency, and required to emit a large amount of light and have a short fluorescence life time (fluorescence decay time) in view of the need for high-speed response and high-energy resolution. It is also important for the emission wavelength of the scintillator to match up with the wavelength band where the detection sensitivity of the photodetector becomes high.

Currently, as a preferable scintillator applied to various radiation detectors, there is a scintillator having a garnet structure. The scintillator having a garnet structure has advantages that the scintillator is chemically stable, is neither cleavable nor deliquescent, and has excellent processability. For example, the scintillator, which is disclosed in Patent Document 1, having a garnet structure that uses luminescence from a 4f5d level of $Pr^{3+}$ has a short fluorescence life time that is not longer than 40 ns.

RELATED DOCUMENT

Patent Document

[Patent Document 1] Pamphlet of International Publication WO. 2006/049284

DISCLOSURE OF THE INVENTION

However, in the technique of Patent Document 1, a peak emission wavelength is as short as not being longer than 350 nm and does not match up with the wavelength to which the PD or Si-PM constituted with a silicon semiconductor exhibits high sensitivity.

The present invention has been made in consideration of the above circumstances, and provides a crystal for a scintillator that is suitably applicable to radiation detectors, has a short fluorescence life time and high density, emits a large amount of light, and has a high degree of energy resolution.

According to a first aspect of the present invention, there is provided a garnet-type crystal for a scintillator that is represented by General Formula (1).

$$Gd_{3-x-y}Ce_xRE_yAl_{5-z}Ga_zO_{12} \qquad (1)$$

In Formula (1), $0.0001 \leq x \leq 0.15$, $0 \leq y \leq 0.1$, $2 < z \leq 4.5$, and RE is at least one selected from Y, Yb, and Lu.

According to the garnet-type crystal for a scintillator that is represented by General Formula (1), if Ga is added to a garnet-type crystal which contains Ce as a light-emitting element, Ga, Al, and O as essential components, and one of Y, Yb, and Lu, a peak emission wavelength of a light-emitting component that is obtained when the crystal is excited with a γ-ray and emits fluorescence may be caused to match up with a wavelength to which the PD or Si-PM constituted with a silicon semiconductor exhibits high sensitivity. Moreover, if the Ga content is set to $2<z$ in the crystal structure represented by General Formula (1), the energy band structure is optimized, and energy transition from an energy level of $Gd^{3+}$ to an energy level of $Ce^{3+}$ is accelerated. As a result, the fluorescence life time is shortened, whereby the content of a light-emitting component having a long life time decreases, and the amount of luminescence increases. In addition, the scintillator crystal has high density and a high degree of energy resolution. Consequently, a garnet-type crystal for a scintillator that is suitably applicable to radiation detectors, has a short fluorescence life time and high density, emits a large amount of light, and has a high degree of energy resolution may be realized.

According to a second aspect of the present invention, there is provided a garnet-type crystal for a scintillator that is represented by General Formula (2).

$$Gd_{3-a-b}Ce_aLu_bAl_{5-c}Ga_cO_{12} \quad (2)$$

In Formula (2), $0.0001 \leq a \leq 0.15$, $0.1 < b \leq 3$, and $2 < c \leq 4.5$.

According to the garnet-type crystal for a scintillator that is represented by General Formula (2), if Ga is added to a garnet-type crystal which contains Ce as a light-emitting element, Al and O as essential components, and Lu, a peak emission wavelength of a light-emitting component that is obtained when the crystal is excited with a γ-ray and emits fluorescence may be caused to match up with a wavelength to which the PD or Si-PM constituted with a silicon semiconductor exhibits high sensitivity. Moreover, if the Ga content is set to $2<c$ in the crystal structure represented by General Formula (2), the energy band structure is optimized, and energy transition from an energy level of $Gd^{3+}$ to an energy level of $Ce^{3+}$ is accelerated. As a result, the fluorescence life time is shortened, whereby the content of a light-emitting component having a long life time decreases, and the amount of luminescence increases. In addition, the scintillator crystal has high density, emits a large amount of light, and has a high degree of energy resolution. Particularly, if the crystal contains Lu in a range of $0.1<b\leq3$, a high-density crystal may be obtained. Consequently, a garnet-type crystal for a scintillator that is suitably applicable to radiation detectors, has a short fluorescence life time and high density, emits a large amount of light, and has a high degree of energy resolution may be realized.

According to a third aspect of the present invention, there is provided a garnet-type crystal for a scintillator that is represented by General Formula (3).

$$Gd_{3-p-q}Ce_pRE'_qAl_{5-r}Ga_rO_{12} \quad (3)$$

In Formula (3), $0.0001 \leq p \leq 0.15$, $0.1 < q \leq 3$, $1 < r \leq 4.5$, and RE' represents Y or Yb.

According to the garnet-type crystal for a scintillator that is represented by General Formula (3), if Ga is added to a garnet-type crystal which contains Ce as a light-emitting element, Al and O as essential components, and Y or Yb, a peak emission wavelength of a light-emitting component that is obtained when the crystal is excited with a γ-ray and emits fluorescence may be caused to match up with a wavelength to which the PD or Si-PM constituted with a silicon semiconductor exhibits high sensitivity. Moreover, if the Ga content is set to $2<r$ in the crystal structure represented by General Formula (3), the energy band structure is optimized, and energy transition from an energy level of $Gd^{3+}$ to an energy level of $Ce^{3+}$ is accelerated. As a result, the fluorescence life time is shortened, whereby the content of a light-emitting component having a long life time decreases, and the amount of luminescence increases. In addition, the scintillator crystal has high density, emits a large amount of light, and has a high degree of energy resolution. Consequently, a garnet-type crystal for a scintillator that is suitably applicable to radiation detectors, has a short fluorescence life time and high density, emits a large amount of light, and has a high degree of energy resolution may be realized.

Moreover, according to the present invention, there is provided a radiation detector including a scintillator that is constituted with the garnet-type crystal for a scintillator and a light receiver that detects luminescence from the scintillator.

According to the present invention, there is provided a garnet-type crystal for a scintillator that is suitably applicable to radiation detectors, has high density, emits a large amount of light, and has a short fluorescence life time and a high degree of energy resolution.

BRIEF DESCRIPTION OF THE DRAWINGS

The objects described above and other objects, characteristics, and advantages will become further clearer by preferable embodiments described below and the following drawings accompanied by the embodiments.

DESCRIPTION OF EMBODIMENTS

Figure 1:
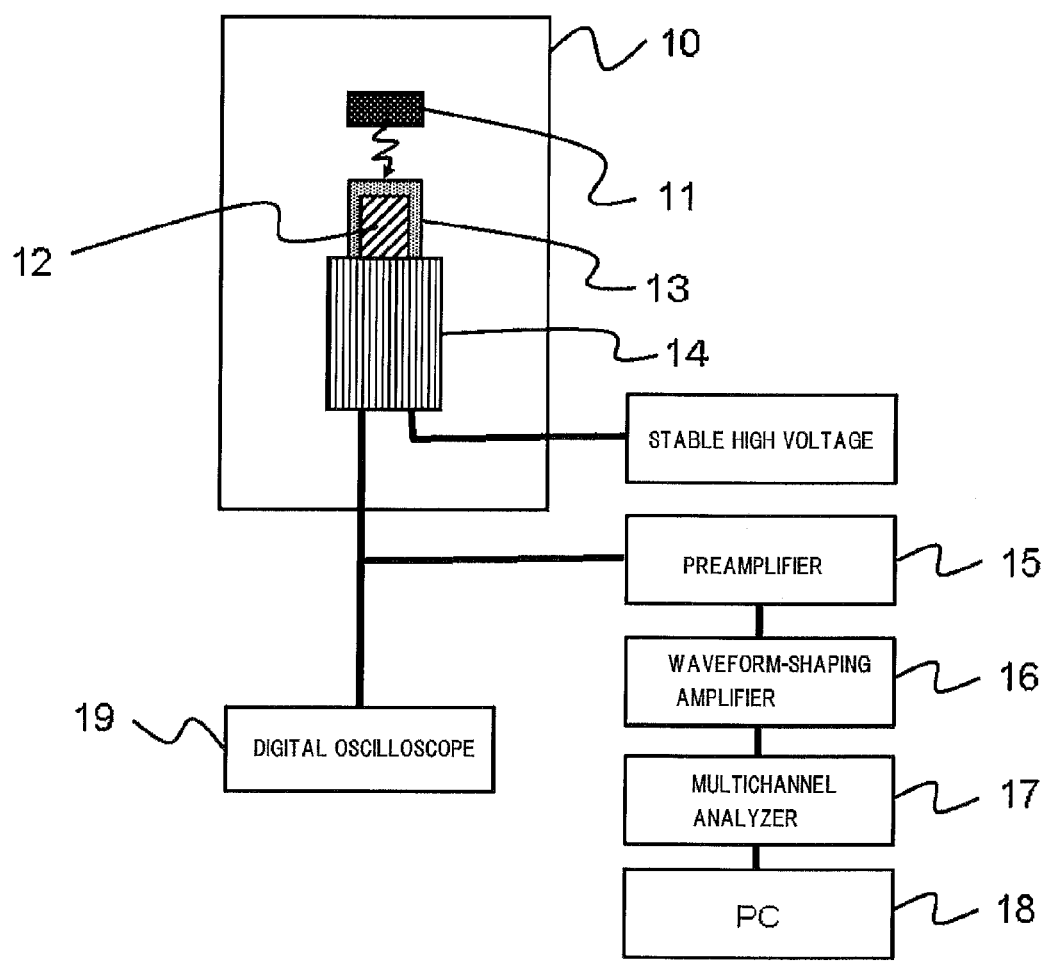
FIG. 1 is a view illustrating an example of a device for measuring the amount of luminescence and a fluorescence decay time at the time when the garnet-type crystal for a scintillator of the present invention is excited with a γ-ray.

A first garnet-type crystal for a scintillator is represented by the following General Formula (1).

$$Gd_{3-x-y}Ce_xRE_yAl_{5-z}Ga_zO_{12} \quad (1)$$

In Formula (1), 0.0001≤x≤0.15, 0≤y≤0.1, and 2<z≤4.5. RE represents at least one selected from Y, Yb, and Lu, and preferably represents Y.

A second garnet-type crystal for a scintillator is represented by the following General Formula (2).

$$Gd_{3-a-b}Ce_aLu_bAl_{5-c}Ga_cO_{12} \qquad (2)$$

In Formula (2), 0.0001≤a≤0.15, 0.1<b≤3, and 2<c≤4.5.

A third garnet-type crystal for a scintillator is represented by the following General Formula (3).

$$Gd_{3-p-q}Ce_pRE'_qAl_{5-r}Ga_rO_{12} \qquad (3)$$

In Formula (3), 0.0001≤p≤0.15, 0.1<q≤3, and 1<r≤4.5. RE' represents Y or Yb, and preferably Y.

The garnet-type crystals represented by Formulae (1) to (3) can be excited with a γ-ray and can emit fluorescence by being excited in this manner. The peak emission wavelength thereof can be set to be equal to or longer than 460 nm and equal to or shorter than 700 nm, and can be more preferably set to be equal to or longer than 480 nm and equal to or shorter than 550 nm.

If the compositional amount of Ce in the garnet-type crystals represented by General Formulae (1) to (3) is set appropriately, energy transition from an energy level of $Gd^{3+}$ to an energy level of $Ce^{3+}$ is accelerated. Consequently, the fluorescence life time is shortened, whereby the content of a long-life light-emitting component decreases, and the amount of luminescence increases.

Specifically, in the garnet-type crystal represented by Formula (1), x as a Ce concentration satisfies 0.0001≤x≤0.15, preferably satisfies 0.001≤x≤0.15, and more preferably satisfies 0.003≤x≤0.15.

In the garnet-type crystal for a scintillator that is represented by Formula (2), a as a Ce concentration satisfies 0.0001≤a≤0.15, preferably satisfies 0.001≤a≤0.10, and more preferably satisfies 0.015≤x≤0.09.

In the garnet-type crystal for a scintillator that is represented by Formula (3), p as a Ce concentration satisfies 0.0001≤p≤0.15, preferably satisfies 0.001≤p≤0.10, and more preferably satisfies 0.015≤p≤0.09.

If the compositional amount of Ga in the garnet-type crystals represented by General Formulae (1) to (3) is set appropriately, energy transition from an energy level of $Gd^{3+}$ to an energy level of $Ce^{3+}$ is accelerated. Consequently, the fluorescence life time is shortened, whereby the content of a long-life light-emitting component decreases, and the amount of luminescence increases.

In the garnet-type crystal represented by Formula (1), z as a Ga concentration satisfies 2<z≤4.5. The lower limit of z is preferably 2.2 or higher, and the upper limit of z is preferably not higher than 4.0.

In the garnet-type crystal for a scintillator that is represented by Formula (2), c as a Ga concentration satisfies 2<c≤4.5, preferably satisfies 3<c≤4.5, and more preferably satisfies 3<c≤4.0.

In the garnet-type crystal for a scintillator that is represented by Formula (3), r as a Ga concentration satisfies 1<r≤4.5, preferably satisfies 2<r≤4.5, and more preferably satisfies 3<r≤4.5.

The amount of fluorescence that is emitted when the garnet-type crystals represented by Formulae (1) to (3) are excited with a γ-ray can be 20,000 photons/MeV or more.

Moreover, if the garnet-type crystal represented by General Formula (1) is made into a single crystal that satisfies 0.003≤x≤0.15 and 2.5≤z≤3.5 in Formula (1), the amount of fluorescence emitted by the γ-ray excitation can be 40,000 photons/MeV or more. If the lower limit is set to be not higher than 50,000 photons/MeV, this is practical though the lower limit is not particularly limited.

If the garnet-type crystal represented by Formula (2) is made into a single crystal that satisfies 0.1<b≤2.5 and 2.5≤c≤3.5 in Formula (2), the amount of fluorescence emitted from the crystal excited with a γ-ray can be 35,000 photons/MeV or more.

In addition, if the garnet-type crystal represented by Formula (3) is made into a crystal that satisfies 0.5≤q≤3 and 2≤r≤4, the amount of fluorescence emitted from the crystal excited with a γ-ray can be 25,000 photons/MeV or more. If the garnet-type crystal is made into a crystal that satisfies 0.5≤q≤1.5 and 2.5≤r≤3.5 in Formula (3), the amount of fluorescence emitted by γ-ray excitation can be 35,000 photons/MeV or more.

The amount of luminescence from the garnet-type crystal of the present invention is measured at 25° C. by using a crystal having a size of φ3 mm×2 mm. The amount can be measured using, for example, a measurement device shown in FIG. 1. In this measurement device, a $^{137}$Ce γ-ray source 11, a scintillator 12 as a sample to be measured, and a photomultiplier tube 14 are arranged in a dark box 10. The scintillator 12 is physically fixed to the photomultiplier tube 14 by using a Teflon tape 13 and optically stuck to the tube by using an optical adhesive or the like. The scintillator 12 is irradiated with a 622 keV γ-ray from the $^{137}$Cs γ-ray source 11, and a pulse signal output from the photomultiplier tube 14 is input into a preamplifier 15 and a waveform-shaping amplifier 16 so as to undergo amplification and waveform shaping. The signal is then input into a multichannel analyzer 17, and an energy spectrum formed by $^{137}$Cs γ-ray excitation is obtained using a personal computer 18. The position of a photoelectric absorption peak in the obtained energy spectrum is compared with Ce:LYSO (amount of luminescence: 33,000 photons/MeV) as a known scintillator, and the amount of luminescence is finally calculated considering the wavelength sensitivity of the photomultiplier tube 14 respectively.

In this measurement method, the amount of luminescence is measured by a scintillation counting method, and a photoelectric conversion efficiency relative to radiation can be measured. Accordingly, the amount of luminescence that is unique to a scintillator can be measured.

The garnet-type crystals represented by Formulae (1) to (3) contain Ga in a predetermined range. Accordingly, the fluorescence life time (fluorescence decay time) of fluorescence emitted by γ-ray excitation can be set to be not longer than 100 ns, preferably not longer than 80 ns, and more preferably not longer than 75 ns. Moreover, the garnet-type crystals represented by Formulae (1) to (3) contain Ga in a predetermined range, the content of a long-life component can be reduced markedly, and for example, the intensity of the long-life component that has a fluorescence life time exceeding 100 ns can be reduced to be not more than 20% of the intensity of the entire fluorescence components.

The reason why the garnet-type crystals represented by Formulae (1) to (3) can shorten a florescence life time and markedly reduce the content of a long-life component can be presumed to be as below.

Figure 2:
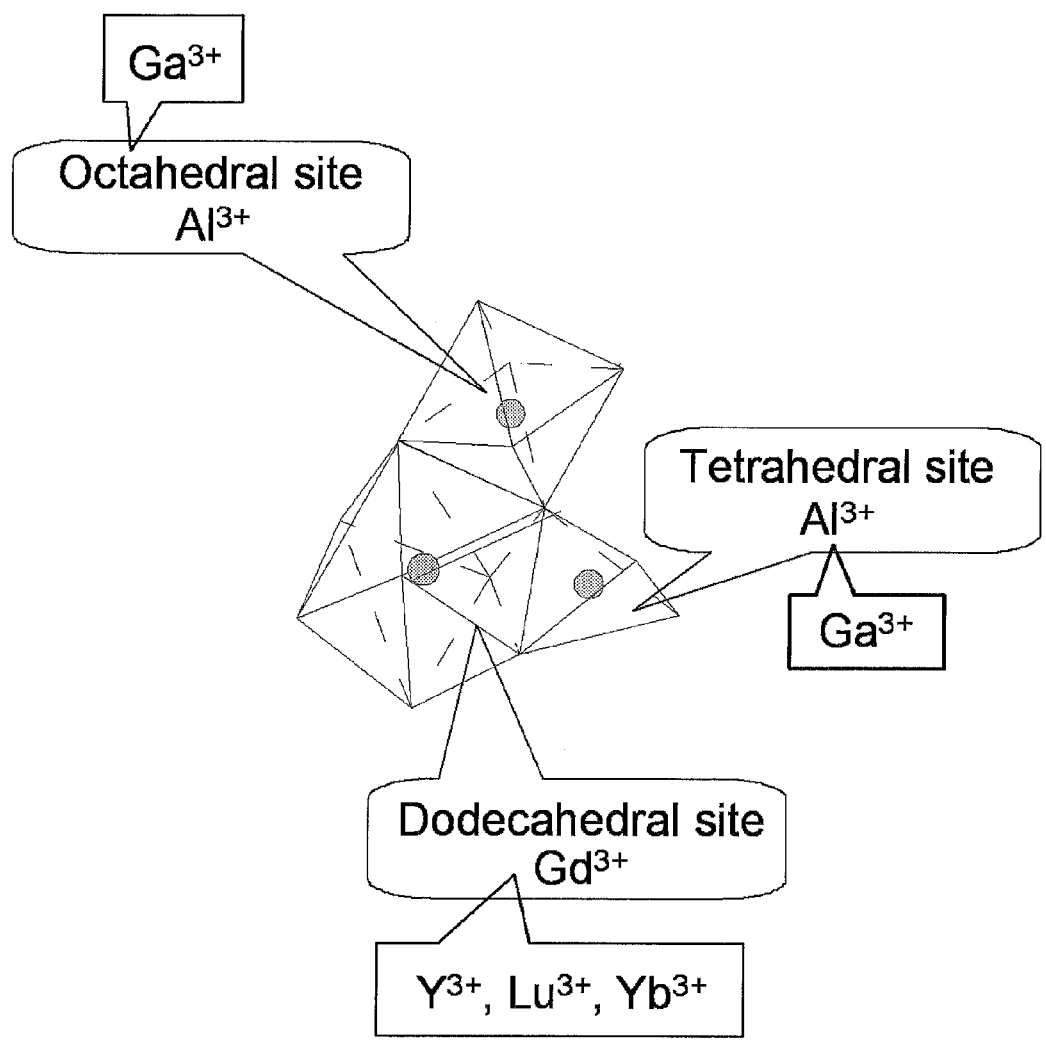
FIG. 2 is a view showing a fact that a life time of fluorescence emitted when the garnet-type crystal for a scintillator of the present invention is excited with a γ-ray is short, and illustrating the principle that reduces the content of a long-life component.

Generally, a garnet-type crystal has a cubical crystalline structure represented by a chemical formula $C_3A_2D_3O_{12}$, and is described by the schematic view such as FIG. 2. In the structure, C is a dodecahedral site, A is an octahedral site, D is a tetrahedral site, and each site is surrounded by $O^{2-}$ ions. For example, gadolinium aluminum garnet constituted with Gd, Al, and O is described as $Gd_3Al_2Al_3O_{12}$. More generally, it is described simply as $Gd_3Al_5O_{12}$, and it is known that Gd is positioned in the dodecahedral site, Al is positioned in the octahedral and tetrahedral sites. Herein, it is known that, for example, when the site of Al in $Gd_3Al_5O_{12}$ is replaced with Ga, Ga is randomly disposed in the octahedral and tetrahedral sites. It is also known that when the site of Gd is replaced with a rare-earth element such as Y, Lu, or Yb, the element is disposed in the dodecahedral sites. For example, when the site of Al in $Gd_3Al_5O_{12}$ is replaced with Ga, the crystal lattice changes, and a lattice constant changes to 12.11 Å in $Gd_3Al_5O_{12}$ and to 12.38 Å in $Gd_3Ga_5O_{12}$. In this manner, if the site of Al is replaced with Ga, the crystal lattice changes, and as a result, the crystal field changes, and the energy band structure also changes.

In the garnet-type crystals represented by General Formulae (1) to (3), if the content of Ga for replacement is optimized, the energy band structure is optimized, the phenomenon of energy transition from an energy level of $Gd^{3+}$ to an energy level of $Ce^{3+}$ is accelerated, and 4f5d light emission of $Ce^{3+}$ is also accelerated. It is considered that for this reason, the fluorescence life time is shortened, and the content of a long-life component decreases.

In the present invention, the decay time of fluorescence emitted by γ-ray excitation can be measured using, for example, the measurement device shown in FIG. 1. Specifically, the scintillator 12 is irradiated with a γ-ray from the $^{137}Cs$ γ-ray source 11, and a pulse signal output from the photomultiplier tube 14 is obtained using a digital oscilloscope 19 to analyze a component causing fluorescence decay. In this manner, it is possible to calculate the fluorescence decay time of the respective components causing fluorescence decay, and a ratio of the intensity of the respective components causing fluorescence decay to the intensity of the entire components having fluorescence life time.

The garnet-type crystals according to Formulae (1) to (3) can be made into high-density crystals.

Specifically, the density of the garnet-type crystal represented by Formula (1) can be in a range of 6.5 g/cm$^3$ to 7.1 g/cm$^3$.

Moreover, the density of the garnet-type crystal represented by Formula (2) can be in a range of 6.7 g/cm$^3$ to 7.8 g/cm$^3$.

In addition, the density of the garnet-type crystal represented by Formula (3) can be in a range of 5.3 g/cm$^3$ to 6.6 g/cm$^3$.

Next, a method of producing the garnet-type crystal of the present invention will be described below. In any production method of crystals composed in any way, an oxide raw material can be used as a starting material in general. However, when the crystal is used as a crystal for a scintillator, it is particularly preferable to use high-purity raw materials having a purity of 99.99% or higher (4 N or more). These starting materials are used by being weighed and mixed such that a desired composition is obtained at the time forming a melt. In addition, it is particularly preferable that the amount of impurities other than the desired composition be as small as possible (for example, not more than 1 ppm) in these raw materials. Particularly, it is preferable to use a raw material that does not contain an element (for example, Tb) of which light emission is observed around the emission wavelength as far as possible.

It is preferable for the crystal to grow in an inert gas (for example, Ar, $N_2$, or He) atmosphere. It is also preferable to use mixed gas containing inert gas (for example, Ar, $N_2$, or He) and oxygen gas. Here, when the crystal is allowed to grow in the mixed gas atmosphere, it is preferable to set a partial pressure of oxygen to be not higher than 2% so as to prevent the oxidation of a crucible. Moreover, in a post-process such as annealing performed after crystal growth, oxygen gas, inert gas (for example, Ar, $N_2$, or He), and mixed gas containing inert gas (for example, Ar, $N_2$, or He) and oxygen gas can be used. When the mixed gas is used, the partial pressure of oxygen is not limited to a value that is not higher than 2%, and mixed gas mixed at any ratio in which the partial pressure of oxygen is from 0% to 100% may be used.

Examples of the method of producing the garnet-type crystal of the present invention include a micro-pulling-down method, Czochralski method (pulling-up method), Bridgman method, a zone melt method, Edge-defined Film-fed Growth (EFG method), and a hot isostatic press sintering method, but the method is not limited to these.

Examples of materials usable for a crucible and an after heater include platinum, iridium, rhodium, rhenium, and an alloy of these.

For producing the crystal for a scintillator, a high-frequency oscillator, a condensing heater, and a resistance heater may also be used.

Among the methods of producing the garnet-type crystal of the present invention, the crystal production method using a micro-pulling-down method will be described below as an example of the method of producing a crystal for a scintillator, but the present invention is not limited thereto.

The micro-pulling-down method can be implemented using a micro-pulling-down apparatus that controls the atmosphere by high-frequency induction heating. The micro-pulling-down apparatus is a single crystal production apparatus including a crucible, a seed-holding tool that holds a seed to be brought into contact with melt flowing out from a fine hole placed in the bottom of the crucible, a moving mechanism that moves down the seed-holding tool, a device that controls the movement speed of the moving mechanism, and an induction heating unit that heats the crucible. According to this single crystal production apparatus, a solid-liquid interface is formed right below the crucible, and the seed crystal is moved down, whereby a crystal can be prepared.

In the micro-pulling-down apparatus, the crucible is made of carbon, platinum, iridium, rhodium, rhenium, or an alloy of these. Moreover, in the outer periphery of the bottom of the crucible, an after heater which is a heating element formed of carbon, platinum, iridium, rhodium, rhenium, or an alloy of these is disposed. The amount of heat generated is adjusted by adjusting the output of the crucible and the induction heating unit of the after heater, whereby it is possible to control the temperature and distribution of the region of a solid-liquid boundary of the melt drawn out from the fine hole placed in the bottom of the crucible.

The atmosphere control-type micro-pulling-down apparatus employs stainless steel (SUS) as the material of the chamber and quartz as the material of the window, and includes a rotary pump to make it possible to control the atmosphere. It is an apparatus in which a degree of vacuum can be set to be not higher than 0.13 Pa ($1 \times 10^{-3}$ Torr) before gas replacement. Moreover, into the chamber thereof, Ar, $N_2$, $H_2$, $O_2$ gas and the like can be introduced by an additional gas flow meter, at a flow rate adjusted accurately.

By using the apparatus, the raw material prepared by the method described above is put into the crucible, air is evacuated from the inside of the furnace to create a high degree of vacuum state, and Ar gas or a mixed gas containing Ar gas and $O_2$ gas is introduced into the furnace. In this manner, an inert gas atmosphere or an atmosphere of a low oxygen partial pressure is formed inside the furnace, and high-frequency power is slowly applied to the high-frequency induction heating coil to heat the crucible, whereby the raw material in the crucible is completely melted.

Subsequently, the seed crystal is slowly raised at a predetermined speed, and the leading end thereof is brought into contact with the fine hole of the bottom of the crucible and allowed to sufficiently adapt to the hole. Thereafter, while the melt temperature is being adjusted, a pulling-down shaft is lowered to allow the crystal to grow.

As the seed crystal, it is preferable to use materials that are equivalent to the object of crystal growth or have a structure and composition close to those of the object, but the present invention is not limited to these. It is also preferable to use a seed crystal having definite orientation.

At the point in time when all of the prepared materials are crystallized and the melt is exhausted, crystal growth ends. Meanwhile, for the purpose of uniformly maintaining the composition and elongating the crystal, an instrument for continuously charging the raw material may be employed.

The garnet-type crystals represented by Formulae (1) to (3) also have advantages that the melting point thereof is low and single crystals are easily produced in large quantities. Specifically, the melting point of the garnet-type crystals represented by Formulae (1) to (3) can be in a range of 1,700° C. to 1,900° C. For example, the melting point of $Lu_3Al_5O_{12}$ and $Y_3Al_5O_{12}$ is 1,980° C. and 1,930° C. respectively, which is a high temperature. However, since the melting point of the crystal of the present invention is low, it is possible to reduce the damage to an insulating material and the damage to a crucible when the crucible is used for preparing crystal. It is also possible to obtain an effect of reducing evaporation of gallium oxide as a constitutional element. Moreover, if z in Formula (1) is 3 or greater, c in Formula (2) is 3 or greater, and r in Formula (3) is 3 or greater, this is preferable since mass production can be realized in a more industrial manner.

As another example of the method of producing the garnet-type crystal of the present invention, a method of preparing transparent ceramics by using a hot isostatic press sintering apparatus is exemplified. In this method, first, the respective powdered raw materials are put into an alumina crucible, an alumina lid is put on the crucible, and then the materials are temporarily sintered for 2 hours at 1,500° C. The scintillator powder having undergone cooling, washing with pure water, and drying is pulverized with a ball mill for 24 hours, thereby obtaining pulverized scintillator powder having a particle size of 1 μm to 2 μm. Thereafter, 5% by weight of pure water is added to the pulverized powder, and uniaxial press molding is performed under a pressure of 500 kg/cm$^2$. Subsequently, cold isostatic pressing is performed with applying a pressure of 3 ton/cm$^2$, thereby obtaining a molding having a density of about 64% of a theoretical density. The obtained molding is then put into a sagger, a lid is put on the sagger, and primary sintering is performed for 3 hours at 1,750° C., thereby obtaining a sintered product having a density of 98.5% or higher of a theoretical density.

Herein, when sintering is performed in a hydrogen, nitrogen, or argon atmosphere, it is preferable to use an alumina sagger as a sagger, and when sintering is performed in vacuum, it is preferable to use boron nitride. In this manner, a desired garnet-type crystal can be efficiently obtained.

It is preferable that the temperature be raised at a rate of 50° C./hr from 1,350° C. In this manner, a uniform sintered product having a high density can be obtained.

Thereafter, finally, hot isostatic press sintering is performed under the conditions of 1,550° C., 3 hours, and 1,000 atm. In this manner, a sintered product having the same density as the theoretical density can be obtained.

The garnet-type crystal of the present invention is a crystal for a scintillator. If combined with a light receiver, the crystal can be used as a radiation detector. Moreover, the crystal can be used in a radiologic examination apparatus which is characterized by including those radiation detectors as radiation detectors. Examples of the radiologic examination apparatus include PET, Single Photon Emission Computed Tomography (SPECT), and CT.

When being excited with radiation, the garnet-type crystal of the present invention can emit light at a peak emission wavelength of equal to or longer than 460 nm and equal to or shorter than 700 nm. Accordingly, the emission wavelength thereof can be matched up with the wavelength to which the PD or Si-PM constituted with a silicon semiconductor exhibits high sensitivity. Moreover, the amount of luminescence at this time is large, so it is possible to realize a radiation detector having a high degree of positional resolution and high S/N.

In addition, the garnet-type crystal of the present invention emits the light of a fluorescence component having a fluorescence life time (fluorescence decay time) of not longer than 100 ns, and can make the intensity of a long-life component having a fluorescence life time exceeding 100 ns be not more than 20% of the intensity of the entire fluorescence components. Accordingly, with the radiation detector including the garnet-type crystal of the present invention, a short time is taken for sampling for fluorescence measurement, and high time resolution is obtained, that is, a sampling interval can be reduced.

Moreover, with the garnet-type crystal of the present invention, energy resolution at 662 KeV can be set to be not higher than 10%. Accordingly, with the radiation detector including the garnet-type crystal of the present invention, radiation can be detected with a high accuracy.

Furthermore, the garnet-type crystal of the present invention has high density. Accordingly, a high-sensitivity detector can be constituted with the crystal, and the apparatus can be downsized.

In the garnet-type crystal represented by Formula (1), a range of $0 \leq y \leq 0.1$ is employed in Formula (1), and Lu is not included in Formula (3). Accordingly, natural radioactivity of Lu can be diminished. Consequently, if the garnet-type crystal represented by Formula (1) or (3) is used, advantages that it is possible to reduce background and to obtain a radiation detector having a higher accuracy are obtained.

As described so far, the garnet-type crystal of the present invention emits a large amount of light, has a high degree of energy resolution and high density, and emits light of short life time. Therefore, with a radiation detector including the garnet-type crystal of the present invention, radiation is detected at a high response rate.

The embodiments of the present invention have been described so far. However, the embodiments are examples of the present invention, and various constitutions other than the above can be employed.

EXAMPLES

Hereinafter, specific examples of the present invention will be described in detail with reference to drawings, but the present invention is not limited thereto. Moreover, in the following examples, a Ce concentration is described as a concentration in a specific crystal or as a concentration in a (charged) melt. However, in the respective examples, there is relationship in which the concentration at the time of charging is about 1 to 10 relative to 1 as a concentration in a crystal.

Example A1

By a micro-pulling-down method, a garnet-type crystal represented by a composition of $Gd_{2.997}Ce_{0.003}Ga_{2.2}Al_{2.8}O_{12}$ was prepared.

Example A2

By a micro-pulling-down method, a garnet-type crystal represented by a composition of $Gd_{2.997}Ce_{0.003}Ga_3Al_2O_{12}$ was prepared.

Example A3

By a micro-pulling-down method, a garnet-type crystal represented by a composition of $Gd_{2.97}Ce_{0.03}Ga_3Al_2O_{12}$ was prepared.

Example A4

By a micro-pulling-down method, a garnet-type crystal represented by a composition of $Gd_{2.85}Ce_{0.15}Ga_3Al_2O_{12}$ was prepared.

Example A5

By a hot isostatic press sintering method, a garnet-type crystal represented by a composition of $Gd_{2.97}Ce_{0.03}Ga_3Al_2O_{12}$ was prepared.

Example A6

By a micro-pulling-down method, a garnet-type crystal represented by a composition of $Gd_{2.97}Ce_{0.03}Ga_4Al_1O_{12}$ was prepared. The melting point thereof was 1,890° C. which is lower than that of $Lu_3Al_5O_{12}$ or $Y_3Al_5O_{12}$.

Example A7

By a micro-pulling-down method, a garnet-type crystal represented by a composition of $Gd_{2.87}Y_{0.1}Ce_{0.03}Ga_3Al_2O_{12}$ was prepared.

Comparative Example A1

By a micro-pulling-down method, a garnet-type crystal represented by a composition of $Gd_{2.97}Ce_{0.03}Al_5O_{12}$ was prepared.

Comparative Example A2

By a micro-pulling-down method, a garnet-type crystal represented by a composition of $Gd_{2.994}Ce_{0.006}Al_4Ga_1O_{12}$ was prepared.

Comparative Example A3

By a micro-pulling-down method, a garnet-type crystal represented by a composition of $Gd_{2.97}Ce_{0.03}Ga_5O_{12}$ was prepared.

Figure 3:
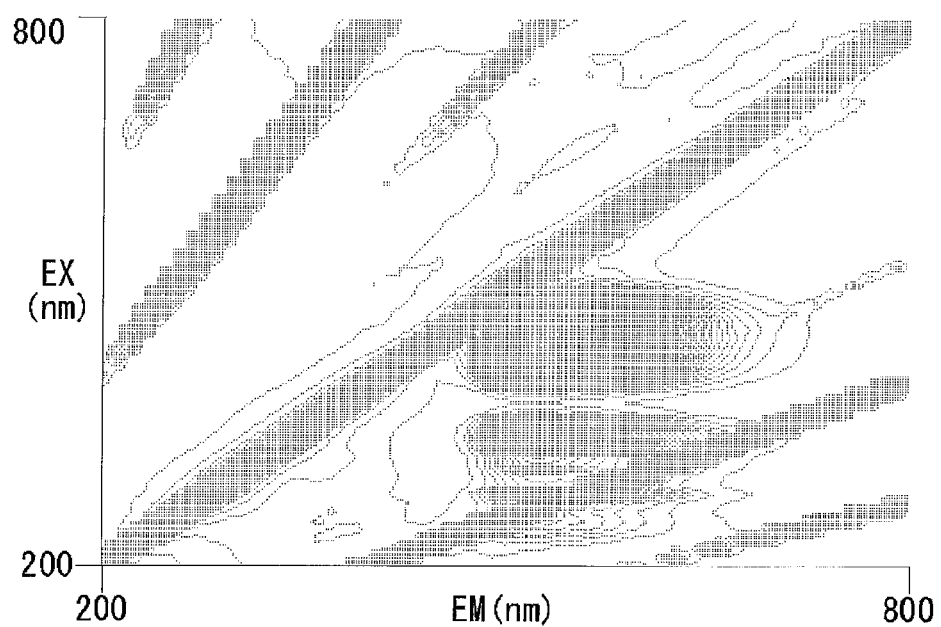
FIG. 3 is a view showing excitation and emission spectra of a $Gd_{2.97}Ce_{0.03}Ga_3Al_2O_{12}$ crystal prepared by a micro-pulling-down method.
Figure 4:
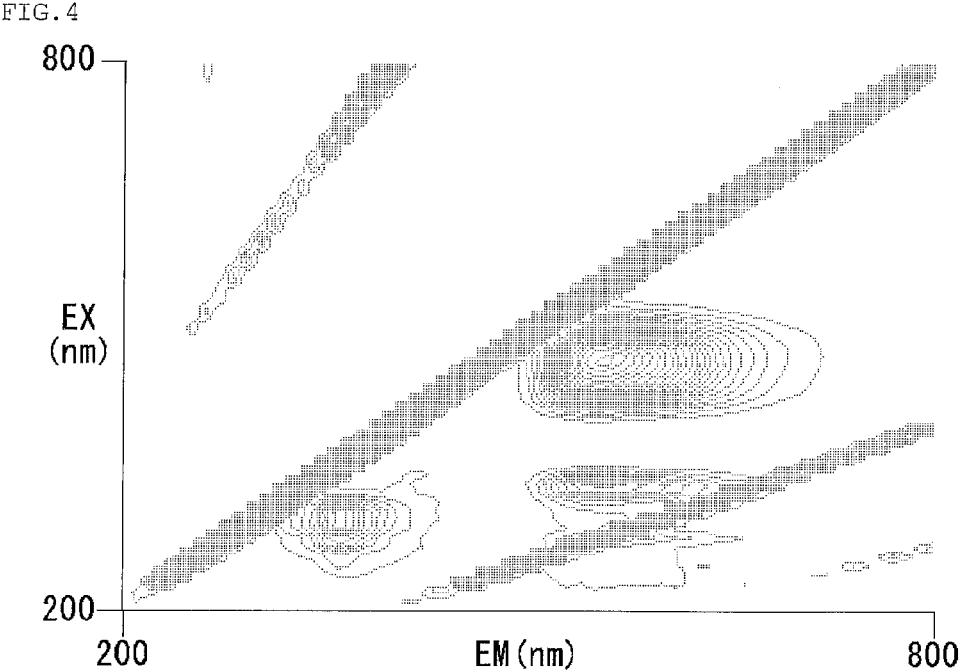
FIG. 4 is a view showing excitation and emission spectra of a $Gd_{2.97}Ce_{0.03}Al_5O_{12}$ crystal prepared by a micro-pulling-down method.

The crystals obtained in Comparative examples A1 to A3 and Examples A1 to A7 were processed and polished to have a size of φ 3 mm×2 mm, and scintillator properties of each of the crystals were evaluated. In addition, excitation and emission spectra of the crystals obtained in examples and comparative examples were measured by a photoluminescence method. Specifically, the profiles shown in FIGS. 3 and 4 were obtained using a spectrophotofluorometer. FIG. 3 shows excitation and emission spectra obtained in Example 3, and FIG. 4 shows excitation and emission spectra obtained in Comparative example A1. In FIGS. 3 and 4, the abscissa indicates an emission wavelength (nm), and the ordinate indicates an excitation wavelength (nm).

Moreover, the crystals were irradiated with a γ-ray from $^{137}Cs$, and the fluorescence decay time and the amount of luminescence were measured. In order to measure the amount of luminescence, the position of a photoelectric absorption peak in the obtained energy spectrum was compared with Ce:LYSO (amount of luminescence: 33,000 photons/MeV) as a known scintillator, and the amount of luminescence was calculated considering the wavelength sensitivity of the photomultiplier tube respectively. The measurement was performed at 25° C.

Various properties of the crystals obtained in Examples A1 to A7 and Comparative examples A1 to A3 are summarized in Tables 1 and 2.

TABLE 1

|  | Theoretical density (g/cm³) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Example A1) $Gd_{2.997}Ce_{0.003}Ga_{2.2}Al_{2.8}O_{12}$ | 6.4 | 535 | 95.7 | 97.7 (87%) 205 (13%) | 36,000 |
| (Example A2) $Gd_{2.997}Ce_{0.003}Ga_3Al_2O_{12}$ | 6.6 | 520 | 71.2 | 72 (96%) 385 (4%) | 40,000 |
| (Example A3) $Gd_{2.97}Ce_{0.03}Ga_3Al_2O_{12}$ | 6.6 | 520 | 71.1 | 69 (100%) | 46,000 |
| (Example A4) $Gd_{2.85}Ce_{0.15}Ga_3Al_2O_{12}$ | 6.6 | 520 | 63 | 9 (8%) 55 (92%) | 42,000 |
| (Example A5) $Gd_{2.97}Ce_{0.03}Ga_3Al_2O_{12}$ | 6.6 | 520 | 68 (95%) 151 (5%) | 63 (95%) 255 (5%) | 23,000 |
| (Example A6) $Gd_{2.97}Ce_{0.03}Ga_4Al_1O_{12}$ | 6.9 | 515 | 49 (85%) 256 (15%) | 52 (85%) 12 (15%) | 20,000 |
| (Example A7) $Gd_{2.87}Y_{0.1}Ce_{0.03}Ga_3Al_2O_{12}$ | 6.6 | 520 | 68 | 65 (100%) | 43,000 |

TABLE 2

|  | Theoretical density (g/cm$^3$) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Comparative example A1) $Gd_{2.97}Ce_{0.03}Al_5O_{12}$ | 6.0 | 540 | — | 78 (82%) 380 (18%) | 500 |
| (Comparative example A2) $Gd_{2.994}Ce_{0.006}Al_4Ga_1O_{12}$ | 6.2 | 540 | 266 | 85.3 (85%) 277 (15%) | 15,000 |
| (Comparative example A3) $Gd_{2.97}Ce_{0.03}Ga_5O_{12}$ | 7.1 | — | — | — | 0 |

As shown in FIG. 3, in the crystal obtained in Example A3, an emission peak derived from 4f4f emission of $Gd^{3+}$ was extremely weak. On the other hand, as shown in FIG. 4, in the crystal of Comparative example A1, an emission peak derived from 4f5d emission of $Ce^{3+}$ was confirmed around an emission wavelength of 530 nm, and an emission peak derived from 4f4f emission of $Gd^{3+}$ was confirmed around an emission wavelength of 312 nm.

In addition, as shown in Examples A2 to A4 of Table 1, as the Ce concentration increased, the fluorescence life time was shortened. The content of a long-life component of 385 ns confirmed in Example A2 decreased as the Ce concentration increased. The long-life component is considered to be generated as a result of energy transition from an energy level of $Gd^{3+}$ to an energy level of $Ce^{3+}$, and it is considered that as the Ce concentration increases, the probability of energy transition is heightened, whereby the content of a long-life component decreases. In addition, the amount of luminescence also increased and became maximum in the crystal of Example A3. From these measurement results, it is possible to confirm the occurrence of a phenomenon of energy transition from an energy level of $Gd^{3+}$ to an energy level of $Ce^{3+}$.

Furthermore, for the crystals of Example A3 and Comparative examples A1 and A2, the fluorescence life time (fluorescence decay time) was measured respectively regarding 4f5d emission of $Ce^{3+}$ around an emission wavelength of 530 nm and 4f4f emission of $Gd^{3+}$ around an emission wavelength of 312 nm, from a fluorescence decay curve observed by photoluminescence. The results are shown in Table 3.

but a long-life component was not confirmed in Example A3. When 4f4f emission of $Gd^{3+}$ at an emission wavelength of 312 nm was excited with a wavelength of 250 nm, a fluorescence life time of several μs to 235 μs was obtained, the Ga concentration increased, and the fluorescence life time was shortened. From the above measurement results, it is possible to confirm the occurrence of a phenomenon of energy transition from an energy level of $Gd^{3+}$ to an energy level of $Ce^{3+}$.

Figure 5:
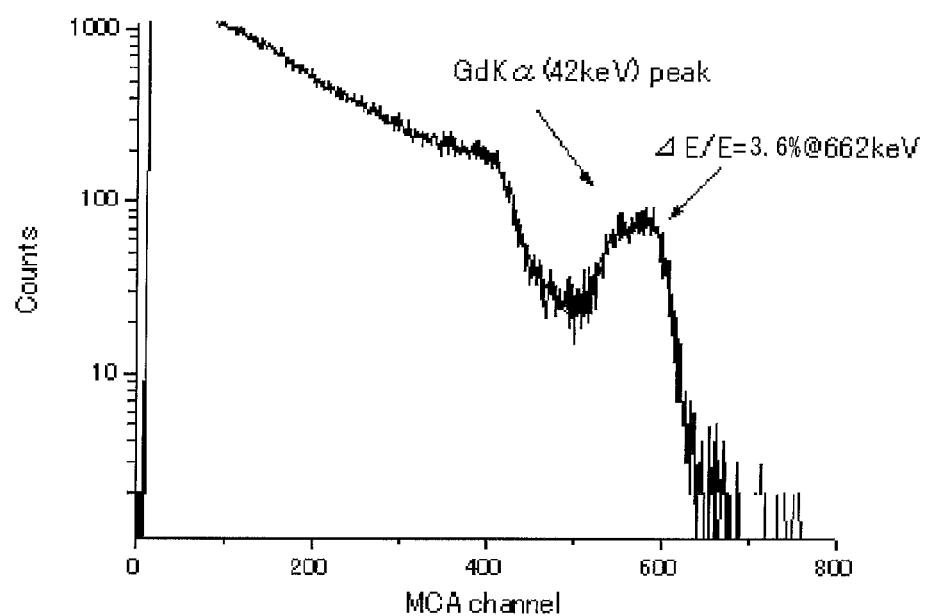
FIG. 5 is a view showing an energy spectrum that is obtained when a $Gd_{2.97}Ce_{0.03}Ga_3Al_2O_{12}$ crystal prepared by a micro-pulling-down method is irradiated with a γ-ray from $^{137}Cs$ and a Photomultiplier Tube (PMT) is used.

The crystal obtained in Example A3 was also irradiated with a γ-ray from $^{137}Cs$, and an energy spectrum thereof was measured using a PMT. The result is shown in FIG. 5. The energy resolution thereof was 3.6%.

Figure 6:
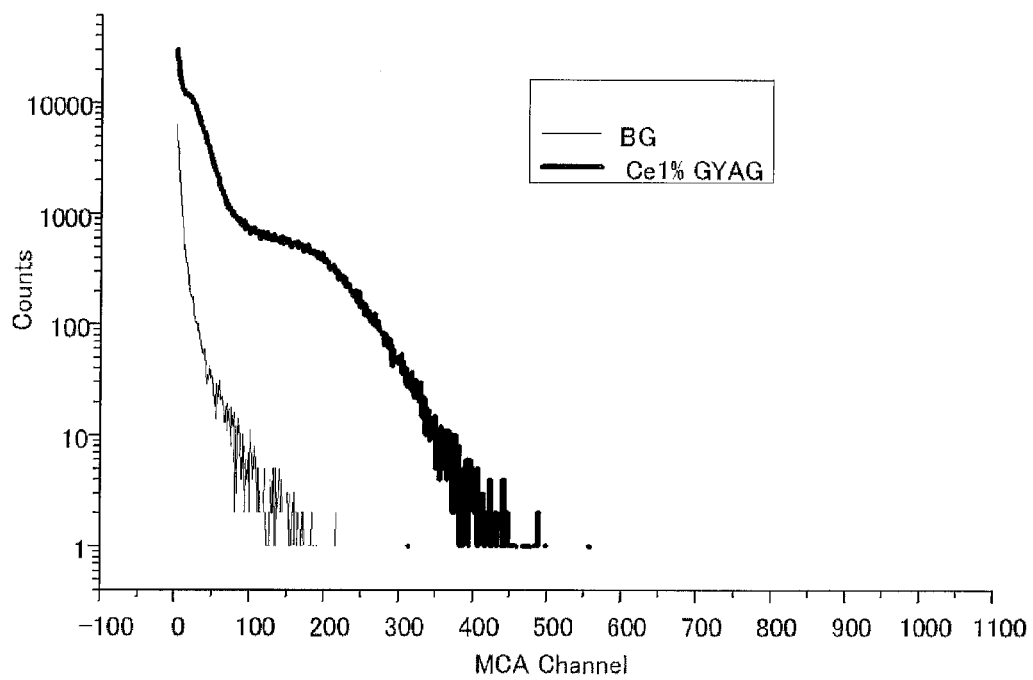
FIG. 6 is a view showing energy spectra obtained by sticking $Gd_{2.97}Ce_{0.03}Ga_3Al_2O_{12}$ to a photomultiplier tube and irradiating the crystal with a $^{252}Cf$ neutron ray. A neutron peak, which is formed when a neutron ray emitted by a (η,γ) reaction between Gd contained in $Gd_{2.97}Ce_{0.03}Ga_3Al_2O_{12}$ and neutrons is absorbed into $Gd_{2.97}Ce_{0.03}Ga_3Al_2O_{12}$, was confirmed.

FIG. 6 shows an energy spectrum obtained by sticking the crystal obtained in Example A3 to a photomultiplier tube by using an optical adhesive and irradiating the crystal with a $^{252}Cf$ neutron ray. A neutron peak, which is formed when a neutron ray emitted by a (η,γ) reaction between Gd contained in $Gd_{2.97}Ce_{0.03}Ga_3Al_2O_{12}$ and a neutron is absorbed into $Gd_{2.97}Ce_{0.03}Ga_3Al_2O_{12}$, was confirmed.

As described above, it was found that if the Ga concentration and Ce concentration in the cerium-activated garnet-type crystal represented by Formula (1) are optimized, the crystal can emit a large amount of light, have a high degree of energy resolution, and can reduce the fluorescence decay time and the content of a long-life component. Moreover, having a peak emission wavelength around 460 nm to 550 nm, the

TABLE 3

|  | Fluorescence lifetime Excitation wavelength of 450 nm Emission wavelength of 530 nm | Fluorescence lifetime Excitation wavelength of 250 nm Emission wavelength of 530 nm | Fluorescence lifetime Excitation wavelength of 250 nm Emission wavelength of 312 nm |
|---|---|---|---|
| (Comparative example A1) $Gd_{2.97}Ce_{0.03}Al_5O_{12}$ | 64 ns (100%) | 78 ns (82%) 380 ns (18%) | 24 μs (15%) 235 μs (85%) |
| (Comparative example A2) $Gd_{2.994}Ce_{0.006}Al_4Ga_1O_{12}$ | 61 ns (100%) | 85.3 ns (85%) 277 ns (15%) | 137 μs (100%) |
| (Comparative example A3) $Gd_{2.97}Ce_{0.03}Ga_3Al_2O_{12}$ | 51 ns (100%) | 69 ns (100%) | 1.4 μs (72%) 10 μs (28%) |

As shown in Table 3, when 4f5d emission of $Ce^{3+}$ around an emission wavelength of 530 nm was directly excited with an excitation wavelength of 450 nm, a fluorescence life time of 44 ns to 55 ns was observed, the Ga concentration increased, and the fluorescence life time was shortened. Moreover, when 4f5d emission of $Ce^{3+}$ was excited with an excitation wavelength of 250 nm which is an excitation wavelength of 4f4f emission of $Gd^{3+}$, the Ga concentration increased, and the fluorescence life time was shortened. In addition, in Comparative examples A1 and A2, a long-life component having a life time of about 300 ns was confirmed, crystal is suitable for being combined with a light receiver of a PD or Si-PM constituted with a silicon semiconductor that exhibits high sensitivity to a wavelength of 460 nm to 700 nm. It was also found that the fluorescence life time of the crystal is about 30 ns to 95 ns and the crystal is extremely excellent as a scintillator material.

All of the crystals obtained in Examples A1 to A4, A6, and A7 and Comparative examples A2 and A3 were transparent single crystals, the crystal of Example A5 was a transparent ceramic, and the crystal of Comparative example A1 was an opaque polycrystal.

Example B1

By a micro-pulling-down method, a garnet-type crystal represented by a composition of $Gd_{0.97}Lu_2Ce_{0.03}Ga_{3.1}Al_{1.9}O_{12}$ was prepared.

Example B2

By a micro-pulling-down method, a garnet-type crystal represented by a composition of $Lu_{2.97}Ce_{0.03}Ga_{3.1}Al_{1.9}O_{12}$ was prepared.

Example B3

By a micro-pulling-down method, a garnet-type crystal represented by a composition of $Gd_{0.97}Lu_2Ce_{0.03}Ga_{2.2}Al_{2.8}O_{12}$ was prepared.

Example B4

By a hot isostatic press sintering method, a garnet-type crystal represented by a composition of $Gd_{0.97}Lu_2Ce_{0.03}Ga_{3.1}Al_{1.9}O_{12}$ was prepared.

Example B5

By a hot isostatic press sintering method, a garnet-type crystal represented by a composition of $Lu_{2.97}Ce_{0.03}Ga_{3.1}Al_{1.9}O_{12}$ was prepared.

Comparative Example B1

By a micro-pulling-down method, a garnet-type crystal represented by a composition of $Lu_{2.97}Ce_{0.03}Al_5O_{12}$ was prepared.

Comparative Example B2

By a micro-pulling-down method, a garnet-type crystal represented by a composition of $Lu_{2.97}Ce_{0.03}Ga_5O_{12}$ was prepared.

Comparative Example B3

By a micro-pulling-down method, a garnet-type crystal represented by a composition of $Gd_{0.97}Lu_2Ce_{0.03}Al_5O_{12}$ was prepared.

Comparative example B4

By a micro-pulling-down method, a garnet-type crystal represented by a composition of $Gd_{0.97}Lu_2Ce_{0.03}Al_4Ga_1O_{12}$ was prepared.

Comparative Example B5

By a micro-pulling-down method, a garnet-type crystal represented by a composition of $Gd_{0.97}Lu_2Ce_{0.03}Ga_5O_{12}$ was prepared.

Figure 7:
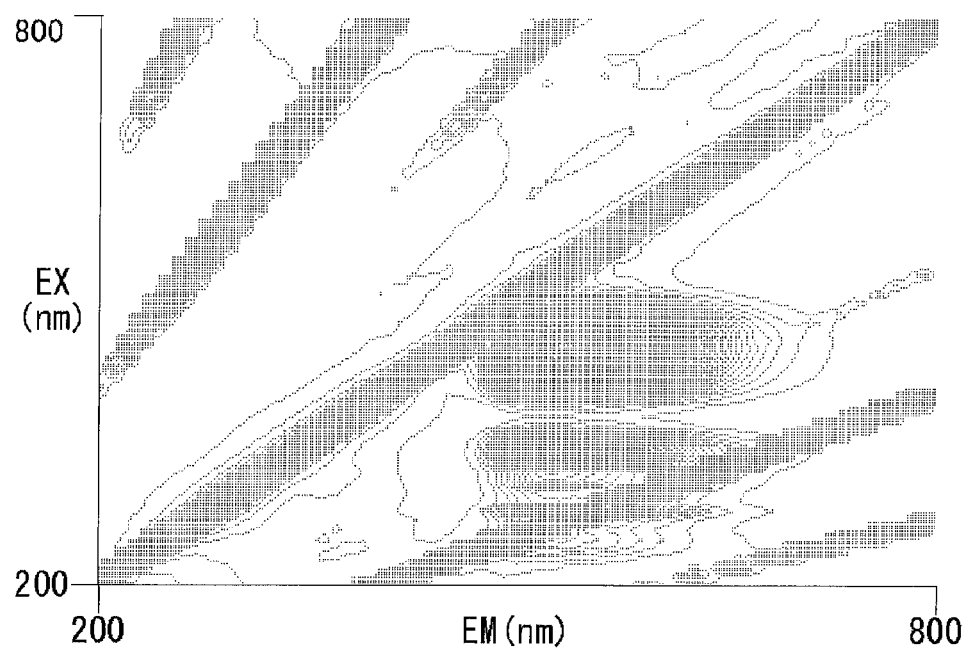
FIG. 7 is a view showing excitation and emission spectra of a $Gd_{0.97}Lu_2Ce_{0.03}Ga_{3.1}Al_{1.9}O_{12}$ crystal prepared by a micro-pulling-down method.
Figure 8:
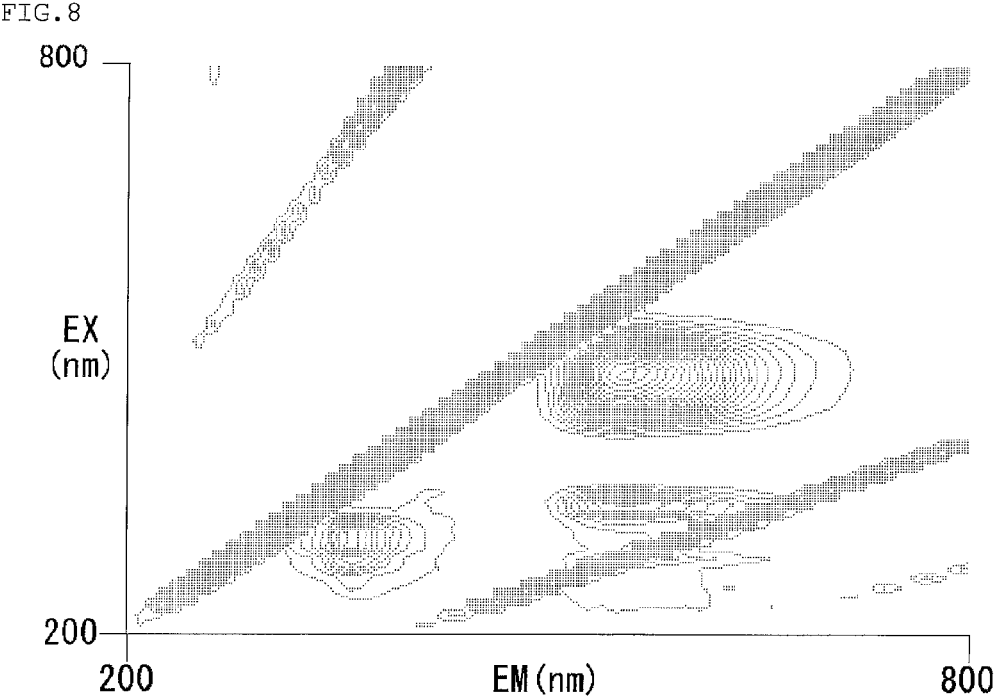
FIG. 8 is a view showing excitation and emission spectra of a $Gd_{0.97}Lu_2Ce_{0.03}Al_5O_{12}$ crystal prepared by a micro-pulling-down method.

The single crystals obtained in Examples B1 to B5 and Comparative examples B1 to B5 were processed and polished to have a size of φ 3 mm×2 mm, and scintillator properties of each of the crystals were evaluated. In addition, excitation and emission spectra of the crystals obtained in examples and comparative examples were measured by a photoluminescence method. Specifically, the profiles shown in FIGS. 7 and 8 were obtained using a spectrophotofluorometer. FIG. 7 shows excitation and emission spectra obtained in Example B1, and FIG. 8 shows excitation and emission spectra obtained in Comparative example B3. In FIGS. 7 and 8, the abscissa indicates an emission wavelength (nm), and the ordinate indicates an excitation wavelength (nm).

Moreover, the crystals were irradiated with a γ-ray from $^{137}Cs$, and the fluorescence decay time and the amount of luminescence were measured. In order to measure the amount of luminescence, the position of a photoelectric absorption peak in the obtained energy spectrum was compared with Ce:LYSO (amount of luminescence: 33,000 photons/MeV) as a known scintillator, and the amount of luminescence was calculated considering the wavelength sensitivity of the photomultiplier tube respectively. The measurement was performed at 25° C.

Various properties of the crystals obtained in Examples B1 to B5 and Comparative examples B1 to B5 are summarized in Tables 4 and 5.

TABLE 4

| | Theoretical density (g/cm³) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Example B1) $Gd_{0.97}Lu_2Ce_{0.03}Ga_{3.1}Al_{1.9}O_{12}$ | 7.1 | 500 | 43 | 7 (3%) 39 (97%) | 36,000 |
| (Example B2) $Lu_{2.97}Ce_{0.03}Ga_{3.1}Al_{1.9}O_{12}$ | 7.4 | 480 | 46 | 43 | 20,000 |
| (Example B3) $Gd_{0.97}Lu_2Ce_{0.03}Ga_{2.2}Al_{2.8}O_{12}$ | 6.9 | 510 | 76 | 62.6 (88%) 235 (12%) | 20,000 |
| (Example B4) $Gd_{0.97}Lu_2Ce_{0.03}Ga_{3.1}Al_{1.9}O_{12}$ | 7.1 | 500 | 43 | 9 (17%) 45 (83%) | 28,000 |
| (Example B5) $Lu_{2.97}Ce_{0.03}Ga_{3.1}Al_{1.9}O_{12}$ | 7.4 | 480 | 49 (87%) 256 (13%) | 42 (85%) 455 (11%) | 20,000 |

TABLE 5

|  | Theoretical density (g/cm$^3$) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Comparative example B1) Lu$_{2.97}$Ce$_{0.03}$Al$_5$O$_{12}$ | 6.7 | 480 | 43 | 78 (90%) 350 (10%) | 9,000 |
| (Comparative example B2) Lu$_{2.97}$Ce$_{0.03}$Ga$_5$O$_{12}$ | 7.8 | — | 46 | — | 0 |
| (Comparative example B3) Gd$_{0.97}$Lu$_2$Ce$_{0.03}$Al$_5$O$_{12}$ | 6.2 | 535 | 76 | 71 (90%) 360 (10%) | 3,000 |
| (Comparative example B4) Gd$_{0.97}$Lu$_2$Ce$_{0.03}$Al$_4$Ga$_1$O$_{12}$ | 6.5 | 525 | 43 | 63 (87%) 316 (13%) | 5,000 |
| (Comparative example B5) Gd$_{0.97}$Lu$_2$Ce$_{0.03}$Ga$_5$O$_{12}$ | 7.3 | — | 49 (87%) 256 (13%) | — | 0 |

As shown in FIG. 7, in the crystal obtained in Example B1, an emission peak derived from 4f4f emission of Gd$^{3+}$ was extremely weak. On the other hand, as shown in FIG. 8, in the crystal of Comparative example B3, an emission peak derived from 4f5d emission of Ce$^{3+}$ was confirmed around an emission wavelength of 530 nm, and an emission peak derived from 4f4f emission of Gd$^{3+}$ was confirmed around an emission wavelength of 312 nm.

Furthermore, for the crystals of Example B1 and Comparative examples B3 and B4, the fluorescence life time (fluorescence decay time) was measured respectively regarding 4f5d emission of Ce$^{3+}$ around an emission wavelength of 530 nm and 4f4f emission of Gd$^{3+}$ around an emission wavelength of 312 nm, from a fluorescence decay curve observed by photoluminescence. The results are shown in Table 6.

TABLE 6

|  | Fluorescence lifetime Excitation wavelength of 450 nm Emission wavelength of 530 nm | Fluorescence lifetime Excitation wavelength of 250 nm Emission wavelength of 530 nm | Fluorescence lifetime Excitation wavelength of 250 nm Emission wavelength of 312 nm |
|---|---|---|---|
| (Comparative example B3) Gd$_{0.97}$Lu$_2$Ce$_{0.03}$Al$_5$O$_{12}$ | 55 ns (100%) | 71 ns (90%) 360 ns (10%) | 11 μs (35%) 106 μs (65%) |
| (Comparative example B4) Gd$_{0.97}$Lu$_2$Ce$_{0.03}$Ga$_1$Al$_4$O$_{12}$ | 54 ns (100%) | 63 ns (87%) 316 ns (13%) | 8 μs (67%) 121 μs (33%) |
| (Example B1) Gd$_{0.97}$Lu$_2$Ce$_{0.03}$Ga$_{3.1}$Al$_{1.9}$O$_{12}$ | 37 ns (100%) | 7 ns (3%) 39 ns (97%) | 1.5 μs (72%) 9.6 μs (28%) |

As shown in Table 6, when 4f5d emission of Ce$^{3+}$ around 530 nm was directly excited with an excitation wavelength of 450 nm, a fluorescence life time of 44 ns to 55 ns was observed, the Ga concentration increased, and the fluorescence life time was shortened. Moreover, when 4f5d emission of Ce$^{3+}$ was excited with an excitation wavelength of 250 nm which is an excitation wavelength of 4f4f emission of Gd$^{3+}$, the Ga concentration increased, and the fluorescence life time was shortened. In addition, in Comparative examples B3 and B4, a long-life component having a life time of about 300 ns was confirmed, but a long-life component was not confirmed in Example B1. When 4f4f emission of Gd$^{3+}$ at an emission wavelength of 312 nm was excited with a wavelength of 250 nm, a fluorescence life time of several μs to 121 μs was obtained, the Ga concentration increased, and the fluorescence life time was shortened. From the above results, it is possible to confirm the occurrence of a phenomenon of energy transition from an energy level of Gd$^{3+}$ to an energy level of Ce$^{3+}$.

As described above, it was found that if the Ga concentration and Ce concentration in the cerium-activated garnet-type crystal represented by Formula (2) are optimized, the crystal can emit a large amount of light and can reduce the fluorescence decay time and the content of a long-life component. Moreover, having a peak emission wavelength of luminescence at around 450 nm to 550 nm, the crystal is suitable for being combined with a light receiver of a PD, Si-PM, or the like constituted with a silicon semiconductor that exhibits high sensitivity to a wavelength of 400 nm to 700 nm. It was also found that the fluorescence life time of the crystal is about 30 ns to 95 ns and the crystal is extremely excellent as a scintillator material.

All of the crystals obtained in Examples B1 to B3 and Comparative examples B1 and B5 were transparent single crystals, and the crystals of Comparative examples B4 and B5 were transparent ceramics.

Example C1

By a micro-pulling-down method, a garnet-type crystal represented by a composition of Gd$_{1.97}$Y$_1$Ce$_{0.03}$Ga$_{3.1}$Al$_{1.9}$O$_{12}$ was prepared.

Example C2

By a micro-pulling-down method, a garnet-type crystal represented by a composition of Gd$_{1.997}$Y$_1$Ce$_{0.003}$Ga$_{3.1}$Al$_{1.9}$O$_{12}$ was prepared.

Example C3

By a micro-pulling-down method, a garnet-type crystal represented by a composition of Gd$_{1.85}$Y$_1$Ce$_{0.15}$Ga$_{3.1}$Al$_{1.9}$O$_{12}$ was prepared.

Example C4

By a micro-pulling-down method, a garnet-type crystal represented by a composition of Gd$_{1.97}$Y$_1$Ce$_{0.03}$Ga$_4$Al$_1$O$_{12}$ was prepared.

Example C5

By a micro-pulling-down method, a garnet-type crystal represented by a composition of $Gd_1Y_{1.97}Ce_{0.03}Ga_{3.1}Al_3O_{12}$ was prepared.

Example C6

By a micro-pulling-down method, a garnet-type crystal represented by a composition of $Gd_1Y_{1.97}Ce_{0.03}Ga_4Al_1O_{12}$ was prepared.

Example C7

By a micro-pulling-down method, a garnet-type crystal represented by a composition of $Y_{2.97}Ce_{0.03}Ga_{3.1}Al_{1.9}O_{12}$ was prepared.

Example C8

By a micro-pulling-down method, a garnet-type crystal represented by a composition of $Gd_{1.997}Y_1Ce_{0.03}Ga_{2.2}Al_{2.8}O_{12}$ was prepared.

Example C9

By a hot isostatic press sintering method, a garnet-type crystal represented by a composition of $Gd_{1.97}Y_1Ce_{0.03}Ga_{3.1}Al_{1.9}O_{12}$ was prepared.

Example C10

By a hot isostatic press sintering method, a garnet-type crystal represented by a composition of $Y_{2.97}Ce_{0.03}Ga_{3.1}Al_{1.9}O_{12}$ was prepared.

Comparative Example C1

By a micro-pulling-down method, a garnet-type crystal represented by a composition of $Y_{2.97}Ce_{0.03}Al_5O_{12}$ was prepared.

Comparative Example C2

By a micro-pulling-down method, a garnet-type crystal represented by a composition of $Y_{2.97}Ce_{0.03}Ga_5O_{12}$ was prepared.

Comparative Example C3

By a micro-pulling-down method, a garnet-type crystal represented by a composition of $Gd_{1.97}Y_1Ce_{0.03}Al_5O_{12}$ was prepared.

Comparative Example C4

By a micro-pulling-down method, a garnet-type crystal represented by a composition of $Gd_{1.97}Y_1Ce_{0.03}Al_4Ga_1O_{12}$ was prepared.

Comparative Example C5

By a micro-pulling-down method, a garnet-type crystal represented by a composition of $Gd_{1.97}Y_1Ce_{0.03}Ga_5O_{12}$ was prepared.

Figure 9:
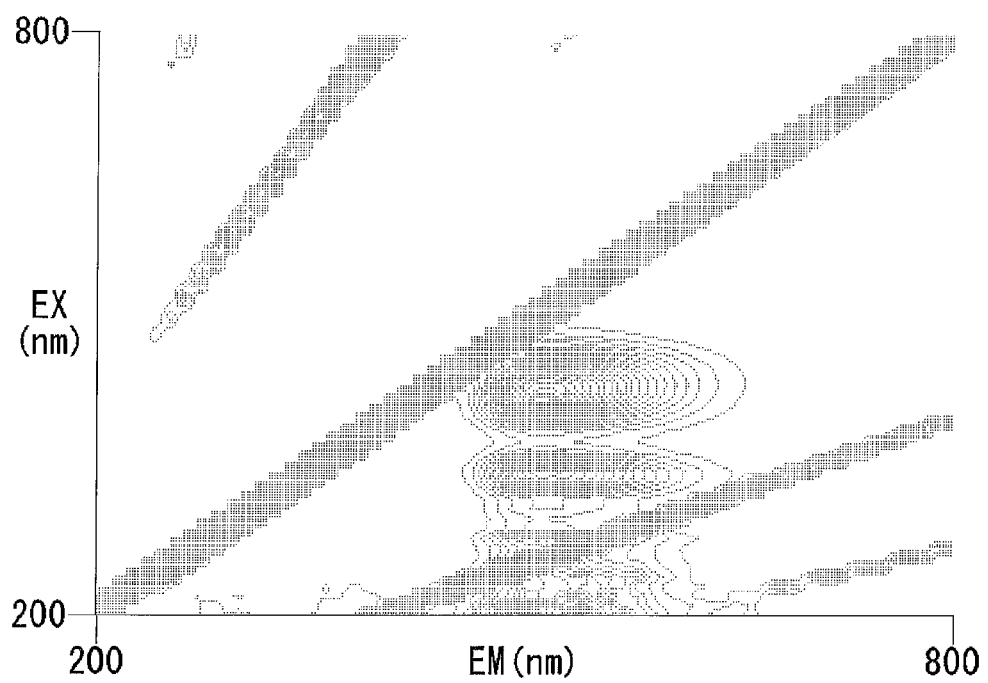
FIG. 9 is a view showing excitation and emission spectra of a $Gd_{1.97}Y_1Ce_{0.03}Ga_{3.1}Al_{1.9}O_{12}$ crystal prepared by a micro-pulling-down method.
Figure 10:
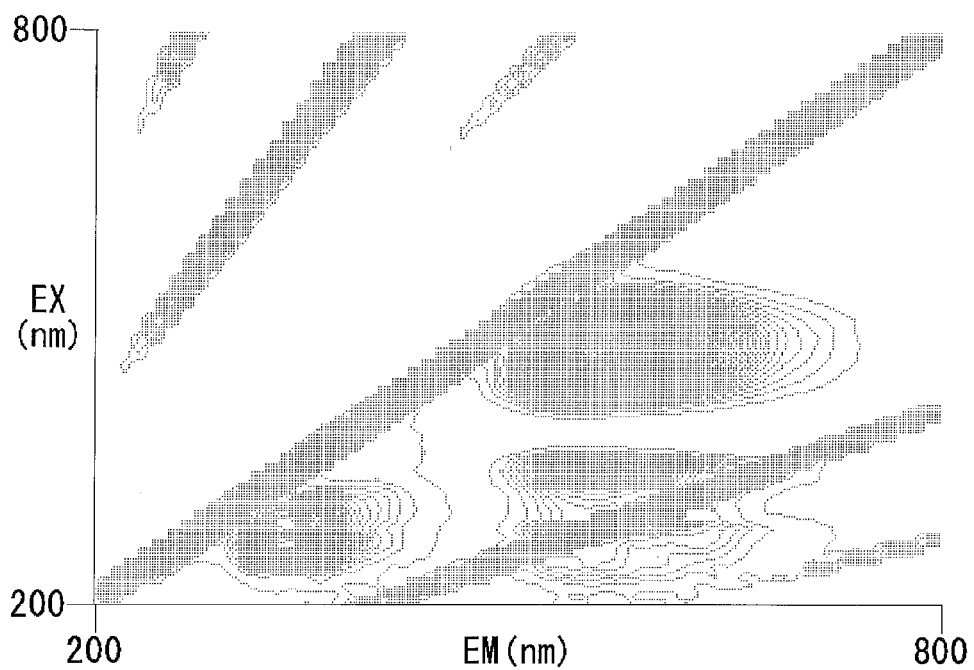
FIG. 10 is a view showing excitation and emission spectra of a $Gd_{1.97}Y_1Ce_{0.03}Al_5O_{12}$ crystal prepared by a micro-pulling-down method.

The single crystals obtained in Examples C1 to 010 and Comparative examples C1 to 5 were processed and polished to have a size of ϕ 3 mm×2 mm, and scintillator properties of each of the crystals were evaluated. In addition, excitation and emission spectra of the crystals obtained in examples and comparative examples were measured by a photoluminescence method. Specifically, the profiles shown in FIGS. 9 and 10 were obtained using a spectrophotofluorometer. FIG. 9 shows excitation and emission spectra obtained in Example C1, and FIG. 10 shows excitation and emission spectra of the crystal obtained in Comparative example C3. In FIGS. 9 and 10, the abscissa indicates an emission wavelength (nm), and the ordinate indicates an excitation wavelength (nm). Moreover, the crystals were irradiated with a γ-ray from $^{137}Cs$, and the fluorescence decay time and the amount of luminescence were measured. In order to measure the amount of luminescence, the position of a photoelectric absorption peak in the obtained energy spectrum was compared with Ce:LYSO (amount of luminescence: 33,000 photons/MeV) as a known scintillator, and the amount of luminescence was calculated considering the wavelength sensitivity of the photomultiplier tube respectively. The measurement was performed at 25° C.

Various properties of the crystals obtained in Examples C1 to C10 and Comparative examples C1 to C5 are summarized in Tables 7 and 8.

TABLE 7

| | Theoretical density (g/cm³) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Example C1) $Gd_{1.97}Y_1Ce_{0.03}Ga_{3.1}Al_{1.9}O_{12}$ | 6.5 | 520 | 55 (84%) 11 (16%) | 5 (5%) 49 (95%) | 36,000 |
| (Example C2) $Gd_{1.997}Y_1Ce_{0.003}Ga_{3.1}Al_{1.9}O_{12}$ | 6.5 | 520 | 56 (92%) 240 (8%) | 51 (89%) 120 (11%) | 42,000 |
| (Example C3) $Gd_{1.85}Y_1Ce_{0.15}Ga_{3.1}Al_{1.9}O_{12}$ | 6.5 | 520 | 50 | 8 (8%) 45 (92%) | 48,000 |
| (Example C4) $Gd_{1.97}Y_1Ce_{0.03}Ga_4Al_1O_{12}$ | 6.6 | 510 | 61 (87%) 23 (13%) | 20 (15%) 58 (85%) | 40,000 |
| (Example C5) $Gd_1Y_{1.97}Ce_{0.03}Ga_{3.1}Al_3O_{12}$ | 5.3 | 520 | 54 | 5 (5%) 48 (95%) | 33,000 |
| (Example C6) $Gd_1Y_{1.97}Ce_{0.03}Ga_4Al_1O_{12}$ | 5.4 | 510 | 48 | 7 (3%) 42 (97%) | 28,000 |
| (Example C7) $Y_{2.97}Ce_{0.03}Ga_{3.1}Al_{1.9}O_{12}$ | 5.3 | 500 | 58 | 52 | 33,000 |

TABLE 7-continued

| | Theoretical density (g/cm³) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Example C8) $Gd_{1.997}Y_1Ce_{0.03}Ga_{2.2}Al_{2.8}O_{12}$ | 6.0 | 520 | 86 | 76 | 28,000 |
| (Example C9) $Gd_{1.97}Y_1Ce_{0.03}Ga_{3.1}Al_{1.9}O_{12}$ | 6.2 | 520 | 29 (16%) 73 (84%) | 32 (65%) 86 (35%) | 48,000 |
| (Example C10) $Y_{2.97}Ce_{0.03}Ga_{3.1}Al_{1.9}O_{12}$ | 5.3 | 500 | 58 (92%) 112 (8%) | 52 (95%) 211 (5%) | 25,000 |

TABLE 8

| | Theoretical density (g/cm³) | Peak emission wavelength (nm) | Fluorescence decay time resulting from γ-ray excitation (ns) | Fluorescence decay time resulting from 250 nm ultraviolet excitation (emission wavelength of 530 nm) (ns) | Amount of luminescence at the time of γ-ray excitation (photon/MeV) |
|---|---|---|---|---|---|
| (Comparative example C1) $Y_{2.97}Ce_{0.03}Al_5O_{12}$ | 4.6 | 480 | 78 (90%) 350 (10%) | 70 | 9,000 |
| (Comparative example C2) $Y_{2.97}Ce_{0.03}Ga_5O_{12}$ | 5.8 | — | — | — | 0 |
| (Comparative example C3) $Gd_{1.97}Y_1Ce_{0.03}Al_5O_{12}$ | 5.5 | 540 | 111 | 58 (73%) 224 (27%) | 11,000 |
| (Comparative example C4) $Gd_{1.97}Y_1Ce_{0.03}Al_4Ga_1O_{12}$ | 5.7 | 540 | 107 | 78.5 (78%) 189 (22%) | 14,000 |
| (Comparative example C5) $Gd_{1.97}Y_1Ce_{0.03}Ga_5O_{12}$ | 6.7 | | | | 0 |

As shown in FIG. 9, in the crystal obtained in Example C1, an emission peak derived from 4f4f emission of $Gd^{3+}$ was extremely weak. On the other hand, as shown in FIG. 10, in the crystal of Comparative example C3, an emission peak derived from 4f5d emission of $Ce^{3+}$ was confirmed around an emission wavelength of 530 nm, and an emission peak derived from 4f4f emission of $Gd^{3+}$ was confirmed around an emission wavelength of 312 nm.

In addition, as shown in Examples C1 to C3 of Table 7, as the Ce concentration increased, the fluorescence life time was shortened. The content of a long-life component of 240 ns confirmed in Example C2 decreased as the Ce concentration increased. The long-life component is considered to be generated as a result of energy transition from an energy level of $Gd^{3+}$ to an energy level of $Ce_{3+}$, and it is considered that as the Ce concentration increases, the probability of energy transition is heightened, whereby the content of a long-life component is reduced. In addition, the amount of luminescence also increased and became maximum in the crystal of Example C3. From these measurement results, it is possible to confirm the occurrence of a phenomenon of energy transition from an energy level of $Gd^{3+}$ to an energy level of $Ce^{3+}$.

Furthermore, for the crystals of Example C1 and Comparative examples C3 and C4, the fluorescence life time (fluorescence decay time) was measured respectively regarding 4f5d emission of $Ce^{3+}$ around an emission wavelength of 530 nm and 4f4f emission of $Gd^{3+}$ around an emission wavelength of 312 nm, from a fluorescence decay curve observed by photoluminescence. The results are shown in Table 9.

TABLE 9

| | Fluorescence lifetime Excitation wavelength of 450 nm Emission wavelength of 530 nm | Fluorescence lifetime Excitation wavelength of 250 nm Emission wavelength of 530 nm | Fluorescence lifetime Excitation wavelength of 250 nm Emission wavelength of 312 nm |
|---|---|---|---|
| (Comparative example C3) $Gd_{1.97}Y_1Ce_{0.03}Al_5O_{12}$ | 54 ns | 58 ns (73%) 224 ns (27%) | 13 μs (32%) 166 μs (68%) |
| (Comparative example C4) $Gd_{1.97}Y_1Ce_{0.03}Al_4Ga_1O_{12}$ | 68 ns (84%) 11 ns (16%) | 78.5 ns (78%) 189 ns (22%) | 7 μs (57%) 98 μs (43%) |
| (Example C3) $Gd_{1.85}Y_1Ce_{0.15}Ga_{3.1}Al_{1.9}O_{12}$ | 50 ns | 8 ns (8%) 45 ns (92%) | 11 μs (68%) 86 μs (34%) |

As shown in Table 9, when 4f5d emission of $Ce^{3+}$ around 530 nm was directly excited with an excitation wavelength of 450 nm, a fluorescence life time of 48 ns to 86 ns was observed, the Ga concentration increased, and the fluorescence life time was shortened. Moreover, when 4f5d emission of $Ce^{3+}$ was excited with an excitation wavelength of 250 nm which is an excitation wavelength of 4f4f emission of $Gd^{3+}$, the Ga concentration increased, and the fluorescence life time was shortened. In addition, in Comparative examples C3 and C4, a long-life component having a life time of about 224 ns was confirmed, but a long-life component was not confirmed in Example C3. When 4f4f emission of $Gd^{3+}$ at an emission wavelength of 312 nm was excited with a wavelength of 250 nm, a fluorescence life time of several μs to 166 μs was obtained, the Ga concentration increased, and the fluorescence life time was shortened. From the above results, it is possible to confirm the occurrence of a phenomenon of energy transition from an energy level of $Gd^{3+}$ to an energy level of $Ce^{3+}$.

Figure 11:
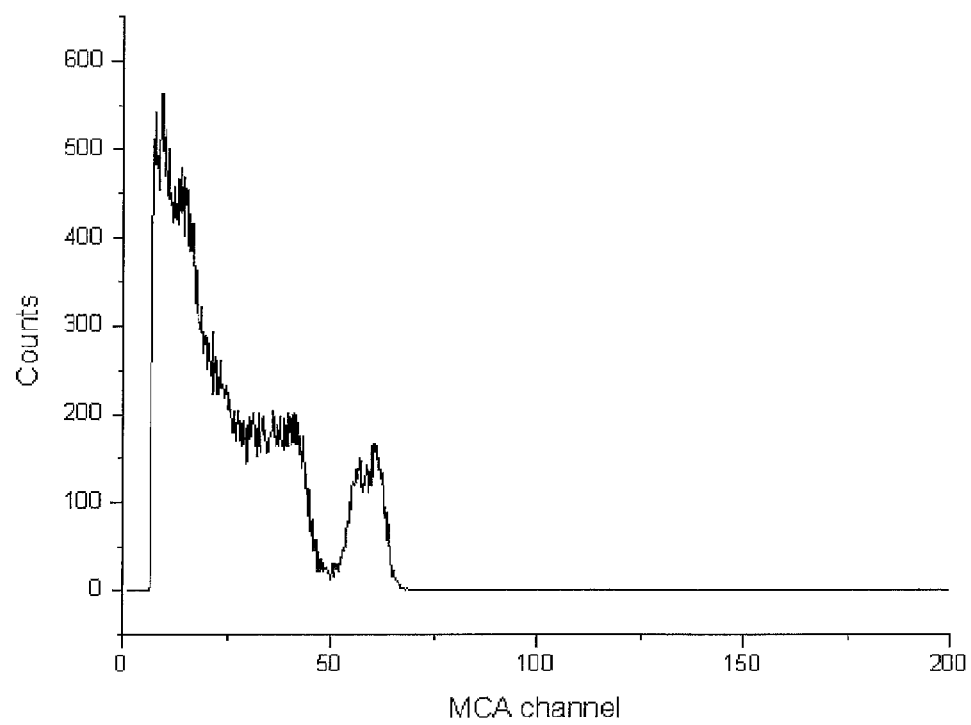
FIG. 11 is a view showing an energy spectrum that is obtained when a $Gd_{1.97}Y_1Ce_{0.03}Ga_{3.1}Al_{1.9}O_{12}$ crystal prepared by a micro-pulling-down method is irradiated with a γ-ray from $^{137}Cs$ and a Photomultiplier Tube (PMT) is used.

Moreover, the crystal obtained in Example C3 was irradiated with a γ-ray from $^{137}Cs$, and an energy spectrum thereof was measured using APD. The result is shown in FIG. 11. The energy resolution thereof was 3.6%.

Figure 12:
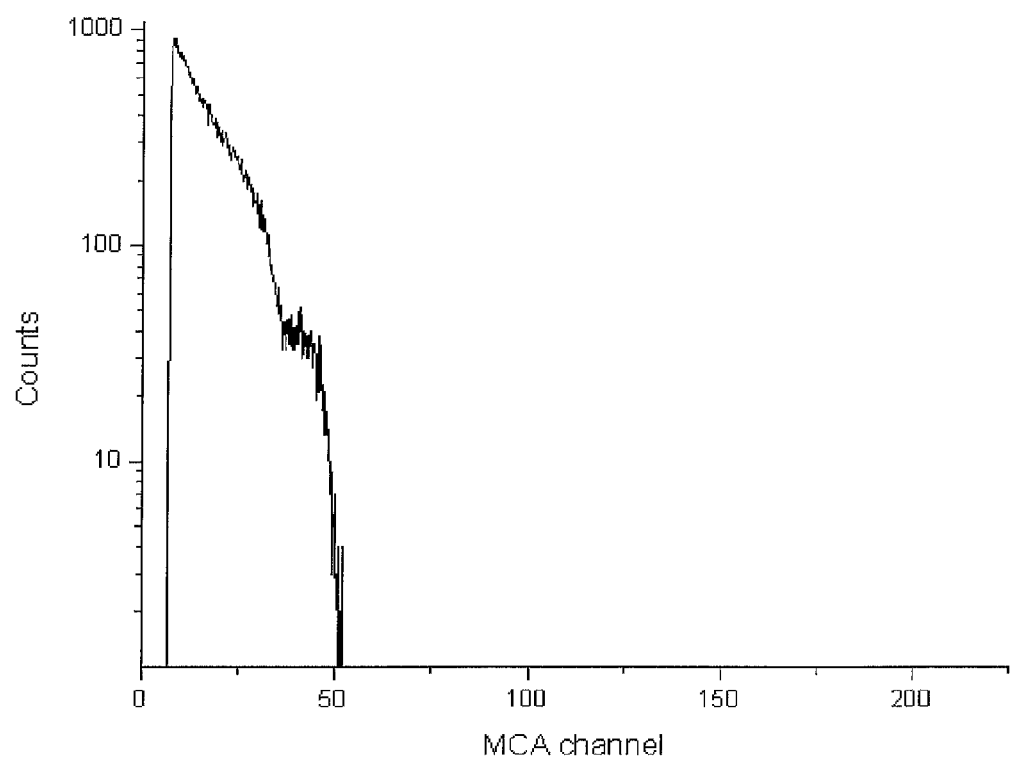
FIG. 12 is a view showing an energy spectrum obtained by sticking $Gd_{1.97}Y_1Ce_{0.03}Ga_{3.1}Al_{1.9}O_{12}$ to a photomultiplier tube and irradiating the crystal with a $^{252}Cf$ neutron ray. A neutron peak, which is formed when a neutron ray emitted by a (η,γ) reaction between Gd contained in $Gd_{1.97}Y_1Ce_{0.03}Ga_{3.1}Al_{1.9}O_{12}$ and neutrons is absorbed into $Gd_{1.97}Y_1Ce_{0.03}Ga_{3.1}Al_{1.9}O_{12}$, was confirmed.

FIG. 12 shows an energy spectrum that is obtained by sticking the crystal obtained in Example C1 to a photomultiplier tube by using an optical adhesive and irradiating the crystal with a $^{252}Cf$ neutron ray. A photo-peak, which is formed when a γ-ray emitted by a (η,γ) reaction between Gd contained in $Gd_{1.97}Y_1Ce_{0.03}Ga_{3.1}Al_{1.9}O_{12}$ and neutrons is absorbed into $Gd_{1.97}Y_1Ce_{0.03}Ga_{3.1}Al_{1.9}O_{12}$, was confirmed.

As described above, it was found that if the Ga concentration and Ce concentration in the cerium-activated garnet-type crystal represented by Formula (3) is optimized, the crystal can emit a large amount of light, and can reduce the fluorescence decay time and the content of a long-life component. In addition, since the crystal has a peak emission wavelength of luminescence at around 450 nm to 550 nm regarding the amount of luminescence, the crystal is suitable for being combined with a light detector of a PD, Si-PM, or the like constituted with a silicon semiconductor that exhibits high sensitivity to a wavelength of 400 nm to 700 nm. It was also found that the fluorescence life time thereof is about 50 ns to 86 ns and the crystal is extremely excellent as a scintillator material.

All of the crystals obtained in Examples C1 to C8 and Comparative examples C1 to C5 were transparent single crystals, and the crystals of Examples C9 and C10 were transparent ceramics.

The invention claimed is:

1. A garnet-type crystal for a scintillator that is represented by General Formula (1), (2), or (3), $$Gd_{3-x-y}Ce_xRE_yAl_{5-z}Ga_zO_{12} \quad (1)$$

wherein in Formula (1), $0.0001 \leq x \leq 0.15$, $0 \leq y \leq 0.1$, $2.5 \leq z \leq 3.5$, and RE represents at least one selected from Y and Yb, $$Gd_{3-a-b}Ce_aLu_bAl_{5-c}Ga_cO_{12} \quad (2)$$

wherein in Formula (2), $0.0001 \leq a \leq 0.15$, $0.1 < b \leq 3$, and $3 < c \leq 4.5$, $$Gd_{3-p-q}Ce_pRE'_qAl_{5-r}Ga_rO_{12} \quad (3)$$

wherein in Formula (3), $0.0001 \leq p \leq 0.15$, $0.1 < q \leq 3$, $1 < r \leq 4.5$, and RE' represents Y or Yb.

2. The garnet-type crystal for a scintillator according to claim 1,
wherein a fluorescence component has a fluorescence lifetime of not longer than 100 ns.

3. The garnet-type crystal for a scintillator according to claim 1,
wherein the intensity of a long-life fluorescence component having a fluorescence lifetime exceeding 100 ns is not higher than 20% of the intensity of the entire fluorescence components.

4. The garnet-type crystal for a scintillator according to claim 1,
wherein a peak emission wavelength of the fluorescence component is equal to or longer than 460 nm and equal to or shorter than 700 nm.

5. The garnet-type crystal for a scintillator according to claim 1,
wherein an amount of luminescence is 20,000 photons/MeV or more.

6. A radiation detector comprising:
a scintillator constituted with the garnet-type crystal for a scintillator according to claim 1; and
a light receiver that detects luminescence from the scintillator.

7. The garnet-type crystal for a scintillator according to claim 1,
wherein the garnet-type crystal is represented by the General Formula (1).

8. The garnet-type crystal for a scintillator according to claim 1,
wherein the garnet-type crystal is represented by the General Formula (1) and in the Formula (1), RE represents Y.

9. The garnet-type crystal for a scintillator according to claim 1,
wherein the garnet-type crystal is represented by the General Formula (1) and in the Formula (1), RE represents Yb.

10. The garnet-type crystal for a scintillator according to claim 1,
wherein the garnet-type crystal is represented by the General Formula (1) and in the Formula (1), $0.003 \leq x \leq 0.15$.

11. The garnet-type crystal for a scintillator according to claim 1,
wherein the garnet-type crystal is represented by the General Formula (2).

12. The garnet-type crystal for a scintillator according to claim 1,
wherein the garnet-type crystal is represented by the General Formula (2) and in the Formula (2), $0.015 \leq a \leq 0.09$.

13. The garnet-type crystal for a scintillator according to claim 1,
wherein the garnet-type crystal is represented by the General Formula (2) and in the Formula (2), $0.015 \leq a \leq 0.09$ and $3 < c \leq 4 \ldots 0$.

14. The garnet-type crystal for a scintillator according to claim 1,
wherein the garnet-type crystal is represented by the General Formula (3).

15. The garnet-type crystal for a scintillator according to claim 1,
wherein the garnet-type crystal is represented by the General Formula (3) and in the Formula (3), RE' represents Y.

16. The garnet-type crystal for a scintillator according to claim 1,
wherein the garnet-type crystal is represented by the General Formula (3) and in the Formula (3), RE' represents Yb.

17. The garnet-type crystal for a scintillator according to claim 1,
wherein the garnet-type crystal is represented by the General Formula (3) and in the Formula (3), $0.015 \leq p \leq 0.09$.

18. The garnet-type crystal for a scintillator according to claim 1,
wherein the garnet-type crystal is represented by the General Formula (3) and in the Formula (3), $3 < r \leq 4.5$.

19. The garnet-type crystal for a scintillator according to claim 1,
wherein the garnet-type crystal is represented by the General Formula (3) and in the Formula (3), $0.5 \leq q \leq 3$ and $2 \leq r \leq 4$.

20. The garnet-type crystal for a scintillator according to claim 1,
wherein the garnet-type crystal is represented by the General Formula (3) and in the Formula (3), $0.5 \leq q \leq 1.5$ and $2.5 \leq r \leq 3.5$.

* * * * *

UNITED STATES PATENT AND TRADEMARK OFFICE
CERTIFICATE OF CORRECTION

PATENT NO.        : 8,969,812 B2
APPLICATION NO.   : 13/982653
DATED             : March 3, 2015
INVENTOR(S)       : Akira Yoshikawa et al.

Page 1 of 1

It is certified that error appears in the above-identified patent and that said Letters Patent is hereby corrected as shown below:

In the Claims

Column 24, Line 57, (Claim 13), delete "$3 < c \leq 4...0$" and insert -- $3 < c \leq 4.0$ --.

Signed and Sealed this
Eleventh Day of August, 2015

Michelle K. Lee
*Director of the United States Patent and Trademark Office*